US008903010B2

(12) United States Patent  
Won et al.

(10) Patent No.: US 8,903,010 B2  
(45) Date of Patent: Dec. 2, 2014

(54) METHODS, SYSTEMS, AND COMPUTER PROGRAM PRODUCTS FOR LOW POWER MULTIMODE INTERCONNECT FOR LOSSY AND TIGHTLY COUPLED MULTI-CHANNEL

(75) Inventors: Chanyoun Won, Westborough, MA (US); Paul D. Franzon, New Hill, NC (US)

(73) Assignee: North Carolina State University, Raleigh, NC (US)

( * ) Notice: Subject to any disclaimer, the term of this patent is extended or adjusted under 35 U.S.C. 154(b) by 78 days.

(21) Appl. No.: 13/469,059

(22) Filed: May 10, 2012

(65) Prior Publication Data

US 2013/0300498 A1 Nov. 14, 2013

(51) Int. Cl.
  *H03F 3/68* (2006.01)
(52) U.S. Cl.
  USPC .......................................................... 375/286
(58) Field of Classification Search
  CPC .................................................... H04B 10/2581
  USPC .......................................................... 375/286
  See application file for complete search history.

(56) References Cited

U.S. PATENT DOCUMENTS

| | | | |
|---|---|---|---|
| 6,292,143 B1 | 9/2001 | Romanofsky | |
| 7,362,130 B2 | 4/2008 | Broyde et al. | |
| 7,408,426 B2 | 8/2008 | Broyde et al. | |
| 7,764,083 B2 | 7/2010 | Broyde et al. | |
| 2003/0123877 A1* | 7/2003 | Lo | 398/34 |
| 2004/0213347 A1* | 10/2004 | Kajiwara | 375/240.11 |
| 2005/0057297 A1* | 3/2005 | Gamble | 327/350 |
| 2007/0011716 A1 | 1/2007 | Koslov et al. | |
| 2008/0049780 A1 | 2/2008 | Whitehead | |
| 2009/0047025 A1 | 2/2009 | Hong et al. | |
| 2010/0246585 A1 | 9/2010 | Mantri et al. | |
| 2013/0117790 A1* | 5/2013 | Coban et al. | 725/71 |
| 2014/0003549 A1 | 1/2014 | Won et al. | |

OTHER PUBLICATIONS

Commonly Assigned, Co-pending U.S. Appl. No. 13/538,448, titled "Methods, Systems, and Computer Program Products for Asymmetric Multimode Interconnect," (unpublished, filed Jun. 29, 2012.)
Broyde, "Clear as a Bell [Controlling Crosstalk in Uniform Interconnections]," IEEE Circuits & Devices Magazine, vol. 20, issue 6, pp. 29-37 (Nov./Dec. 2004).
Choi et al., "Multimode Transceiver for High-Density Interconnects: Measurement and Validation," Electronic Components and Technology Conference, pp. 1733-1738 (2010).
Choi et al., "Multimode signaling on non-ideal channels," in Proc. IEEE 17th Topical Meeting on Electrical Performance of Electronic Packaging (EPEP), pp. 51-54, San Jose, CA (Oct. 2008).
Non-Final Office Action for U.S. Appl. No. 13/538,448 (Jun. 30, 2014).

* cited by examiner

*Primary Examiner* — Michael Neff
(74) *Attorney, Agent, or Firm* — Jenkins, Wilson, Taylor & Hunt, P.A.

(57) ABSTRACT

Methods, systems, and computer readable media for low power multimode interconnect for lossy and tightly coupled multi-channel are disclosed. According to one aspect, a system for low power multimode interconnect includes a receiver for receiving a plurality of input signals that have been encoded by a multimode encoding equation to have voltage levels according to the multimode encoding equation and for decoding the received signals according to a multimode decoding equation to produce binary data as output, wherein the receiver includes a set of frequency-compensated amplifiers for emphasizing high-frequency components of the received input signals and a set of latches for receiving amplified signals from the frequency-compensated amplifiers and for decoding the amplified signals according to the multimode decoding equation to produce binary data as output.

25 Claims, 8 Drawing Sheets

METHODS, SYSTEMS, AND COMPUTER PROGRAM PRODUCTS FOR LOW POWER MULTIMODE INTERCONNECT FOR LOSSY AND TIGHTLY COUPLED MULTI-CHANNEL

TECHNICAL FIELD

The subject matter described herein relates to methods and systems for providing high-speed communication between electronic devices in a system, multichip module, printed circuit board, and the like. More particularly, the subject matter described herein relates to systems, methods, and computer readable media for low power multimode interconnect for lossy and tightly coupled multi-channel.

BACKGROUND

An interconnect system is a system by which information is communicated between distinct entities, such as between computer chips on a printed circuit board (PCB) or multi-chip module (MCM). The term "interconnect", when used as a noun, refers to the medium by which the information is communicated. An interconnect may be an electrical connection, such as a wire or signal trace on a PCB or MCM, an optical connection, such as an optical fiber, or a wireless connection, such as a radio-frequency link. As used herein, however, the term "interconnect system" refers to a system that communicates information or data via a physical, electrical connection.

A binary interconnect system transmits information by imposing one of two possible states onto each line or channel of the interconnect. For example, a binary interconnect system may impose one of two voltages onto each line of the interconnect, or may impose current through each line of the interconnect, where the current is one of two levels or one of two directions. In a binary interconnect system, the two possible states may represent two logical values, e.g., 0 and 1. A multi-mode interconnect (MMI) system codes bits onto a set of levels distributed across a multi-channel interconnection, such as across a wire bundle containing multiple wires.

However, there are disadvantages associated with multimode interconnect systems. One problem is that, as signals travel down the interconnect, they will suffer some signal loss, and the longer the distance traveled the lower the signal-to-noise ratio becomes. For example, the signal-to-noise becomes unacceptably poor for tightly coupled micro-strip lines that are more than 20 inches long.

Thus, there exists a need for methods and systems for improved multimode interconnect. Accordingly, there is a need for methods, systems, and computer program products for low power multimode interconnect for lossy and tightly coupled multi-channel.

SUMMARY

According to one aspect, the subject matter described herein includes a system for low power multimode interconnect. The system includes a receiver for receiving a plurality of input signals that have been encoded by a multimode encoding equation to have voltage levels according to the multimode encoding equation and for decoding the received signals according to a multimode decoding equation to produce binary data as output, wherein the receiver includes a set of frequency-compensated amplifiers for emphasizing high-frequency components of the received input signals and a set of latches for receiving amplified signals from the frequency-compensated amplifiers and for decoding the amplified signals according to the multimode decoding equation to produce binary data as output.

According to another aspect, the subject matter described herein includes a method for low power multimode interconnect. The method includes receiving a plurality of input signals that have been encoded by a multimode encoding equation to have voltage levels according to the multimode encoding equation and decoding the received signals according to a multimode decoding equation to produce binary data as output, using a plurality of frequency-compensated amplifiers for emphasizing high-frequency components of the received input signals and a plurality of latches for receiving amplified signals from the frequency-compensated amplifiers and for decoding the amplified signals according to the multimode decoding equation to produce binary data as output.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media for low power multimode interconnect are provided. The systems and methods herein presented overcome the limitations of conventional approaches and provide acceptable performance for lossy and tightly coupled multi-channel interconnects, including for highly coupled micro-strip links of 20 or more inches in length. Reference will now be made in detail to exemplary embodiments of the present invention, examples of which are illustrated in the accompanying drawings. Wherever possible, the same reference numbers will be used throughout the drawings to refer to the same or like parts. As used herein, where a signal is named "X", the binary complement of that signal will be referred to as "X bar" in the text and will be labeled as X with an overbar (i.e., "$\overline{X}$") in the Figures. As used herein, a multilevel signal is a signal that can have more than two values.

Figure 1:
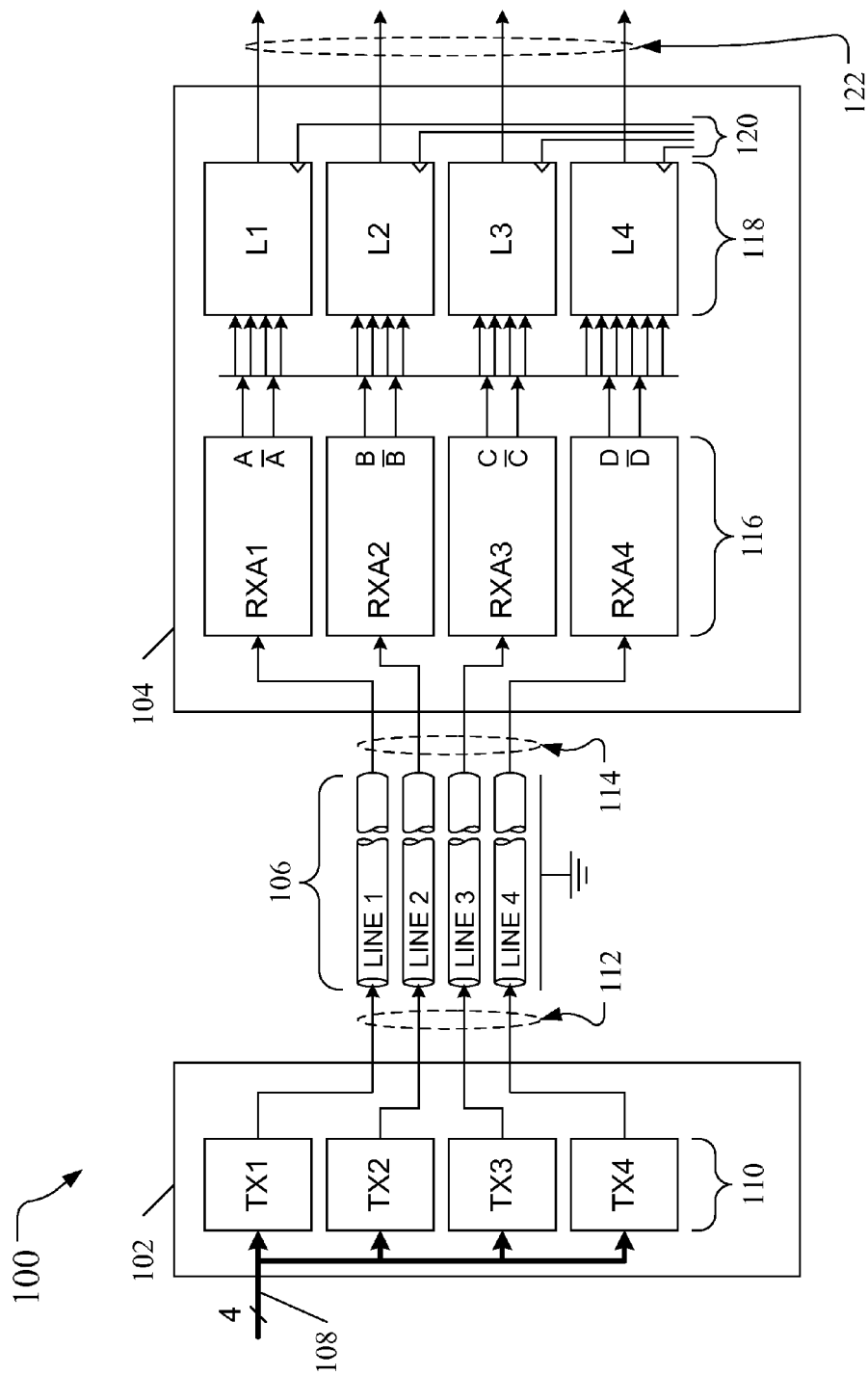
FIG. 1 is a block diagram illustrating an exemplary system for low power multimode interconnect for lossy and tightly coupled multi-channel according to an embodiment of the subject matter described herein.

FIG. 1 is a block diagram illustrating an exemplary system for low power multimode interconnect according to an embodiment of the subject matter described herein. System 100 includes a transmitter 102 which transmits data to a receiver 104 via a set of interconnects 106. System 100 provides cross-talk cancellation signaling and channel loss equalization in a single-ended signaling scheme.

In the embodiment illustrated in FIG. 1, transmitter 102 receives four bits of input binary data 108, which are encoded according to a multimode encoding algorithm by a set of transmitter (TX) drivers 110, which generate multilevel signals 112. In one embodiment, TX drivers 110 encode signals 108 according to a matrix of coefficients, herein referred to as the transmit matrix or "T matrix", where each of the four drivers, labeled TX1 through TX4, receives all bits of input binary data 108 and generates an analog output voltage according to the coefficients of the T matrix. This produces a set of analog voltages 112, each driving a respective channel or line, labeled line 1 through line 4 in FIG. 1, within the set of interconnects 106.

The multimode signals 114 that emerge at the far end of the set of interconnects 106 may have degraded signal to noise ratios. Where the interconnects are densely routed or located close to one another, noisy multimode signals 114 may also include crosstalk that was induced in each line by the signals being transmitted within the other lines of interconnect 106.

Noisy multimode signals 114 are input into receiver 104. In one embodiment, these noisy signals are first amplified by frequency-compensated receive (RX) amplifiers 116, which provide passive equalization to compensate for signal loss due to transmission through the set of interconnects 106. In the embodiment illustrated in FIG. 1, each RX amplifier 116 produces two opposite phase multi-level signals. For example, the RX amplifier connected to line 1 produces multi-level signals "A" and "A bar", the RX amplifier connected to line 2 produces multi-level signals "B" and "B bar", the RX amplifier connected to line 3 produces multi-level signals "C" and "C bar", and the RX amplifier connected to line 4 produces multilevel signals "D" and "D bar".

These eight multilevel signals are then decoded according to a multimode decoding algorithm. In one embodiment, the received signals are decoded In the embodiment illustrated in FIG. 1, each of a set of clocked latches 118 accepts as input some combination of the eight available signals, which are combined according to the multimode decoding algorithm to produce binary outputs 112. In one embodiment, three of the latches use only four of the multi-level signals to recover the transmitted data while the fourth latch performs a summing operation that requires eight signals to reconstruct the transmitted binary information. In one embodiment, receiver 104 decodes using a matrix of coefficients that is the inverse of the T matrix, herein referred to as the $T^{-1}$ matrix, where each latch 118 performs an operation using the amplified multi-level signals. The structures of example latches will be described in greater detail below. The reconstructed binary outputs 112 will be the same values as the corresponding binary inputs 108.

Figure 2:
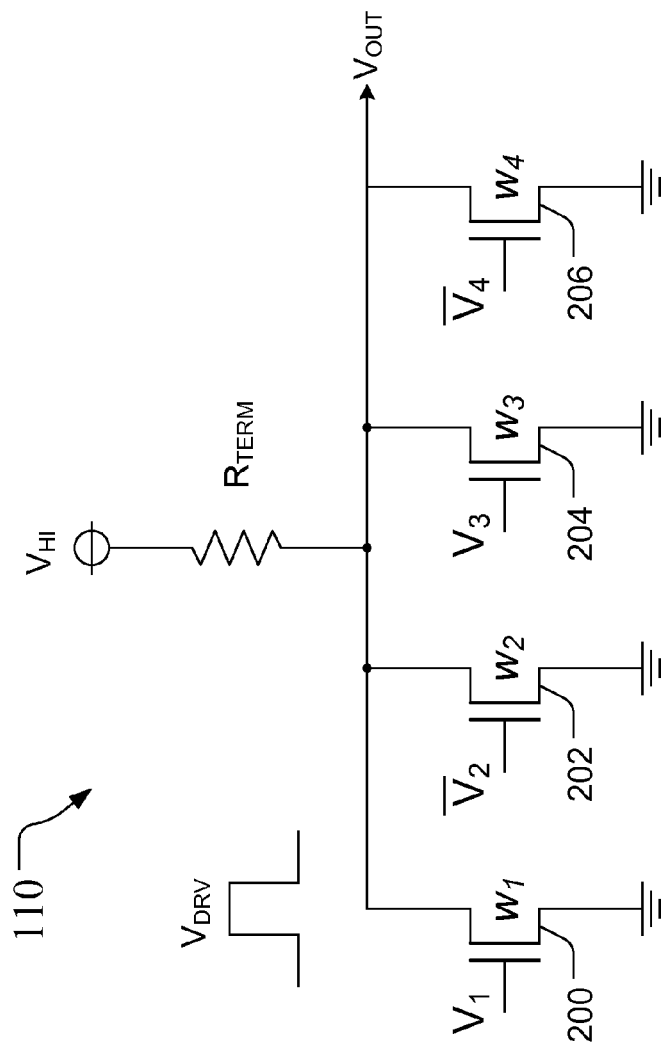
FIG. 2 is a block diagram illustrating an exemplary TX driver according to an embodiment of the subject matter described herein.

FIG. 2 is a block diagram illustrating an exemplary TX driver 110 according to an embodiment of the subject matter described herein. In the embodiment illustrated in FIG. 2, NMOS transistors 200, 202, 204, and 206 are pull-down transistors that, when conducting, act as the bottom half of a voltage divider with pull-up resistor $R_{TERM}$ forming the top half of the voltage divider to produce a desired voltage $V_{OUT}$. In one embodiment, the width of each NMOS transistor is proportional to the corresponding encoding coefficient to implement the encoding equation. For example, for an encoding T matrix with first row values of 0.636, −0.4454, 0.537, and −0.2973, the four digit coefficients may be rounded to 0.64, −0.45, 0.54, and −0.30, respectively. The NMOS device width ratios $W_1:W_2:W_3:W_4$ would be implemented as 0.64: 0.45:0.54:0.30. Since the input signals $V_1$, $V_2$, $V_3$, and $V_4$ are connected to their respective NMOS pull-down transistors, the binary inputs $V_2$ and $V_4$ would be inverted to reflect the fact that their encoding coefficients are negative numbers. Each of the four TX drivers 110 may have its own set of coefficients and thus may have its own set of NMOS device width ratios. Thus, the width ratios for one of the TX drivers 110 may be different from the width ratios for another of the TX drivers 110.

In one embodiment, there may be two supplies for TX drivers 110: $V_{HI}$ and $V_{DRV}$. To avoid an impedance mismatch, which may cause signal reflections, two different power rails may be used for constant TX driver output impedance. To achieve proper impedance of the TX driver output for all input combinations, NMOS transistors 200, 202, 204, and 206 may be operated in the saturation region. In one embodiment, for example, $V_{DRV}$=0.9 V and $V_{HI}$=1.1V. Depending on input data combinations, from 0000 to 1111, the TX driver generates 16 different levels correspondingly.

Figure 3:
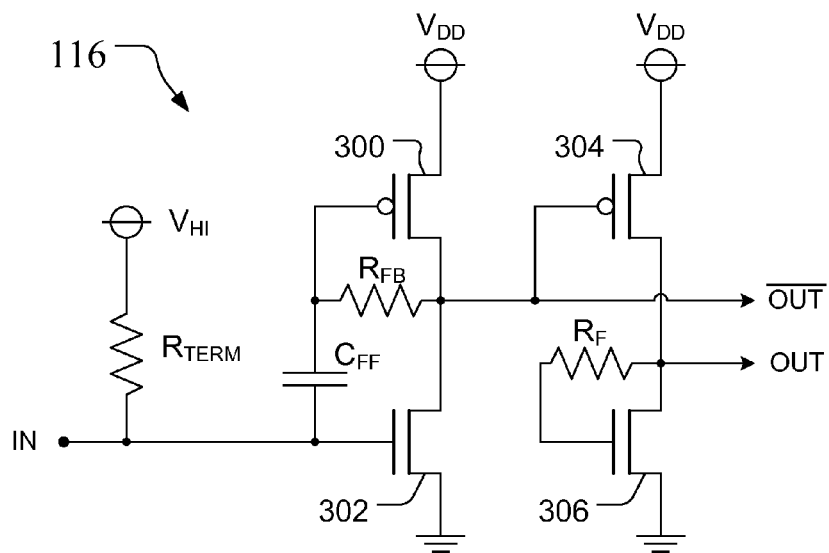
FIG. 3 is a circuit diagram illustrating an exemplary RX amplifier according to an embodiment of the subject matter described herein.

FIG. 3 is a circuit diagram illustrating an exemplary RX amplifier 116 according to an embodiment of the subject matter described herein. In the embodiment illustrated in FIG. 3, an input signal, IN, is provided to the input of the inverter formed by devices 300 and 302 to produce OUT bar, which is then provided to the input of the inverter formed by devices 304 and 306 to produce OUT. OUT is the same phase as IN, but OUT bar is the opposite phase as IN. The feedback resistor $R_{FB}$ and feed forward capacitor $C_{FF}$ operate to emphasize the high-frequency components of the input signal. In one embodiment, high-frequency components are components having a frequency of 1 GHz, but other frequency thresholds may be used, e.g., other frequencies may be emphasized, depending on the specific application and considering factors such as data period, slew rate, channel characteristics, and the like. In one embodiment, RX amplifier 116 is designed to boost the signal-to-noise ratio of signals having frequencies that are most attenuated by the multimode interconnect, e.g., to compensate for transmission loss. The feedback resistor and feed forward capacitor allow the RX amplifier to provide higher gain for high-frequency components, thereby emphasizing those high-frequency components. However, the feed-forward capacitor value has to be carefully selected. If the RC discharging time is longer than the data period, this may introduce signal distortion due to overemphasized signals.

Figure 4:
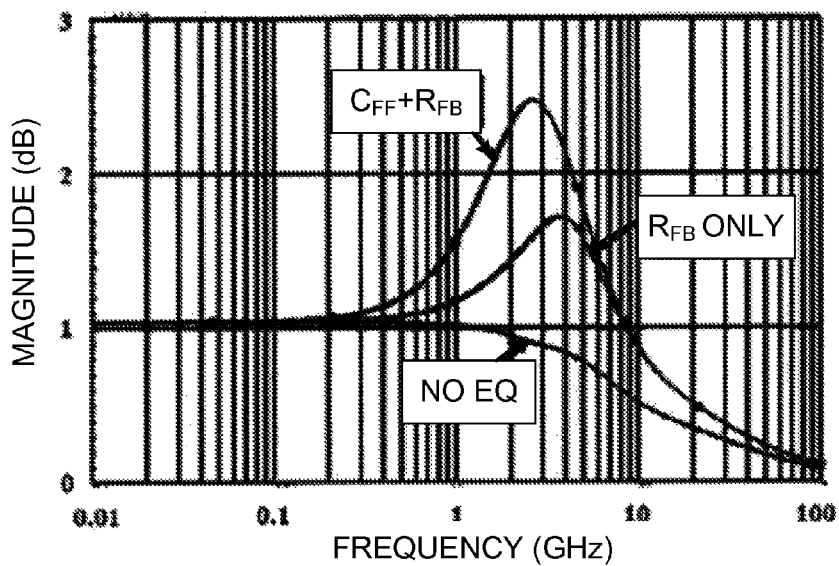
FIG. 4 is a graph showing the performance of an exemplary RX amplifier according to an embodiment of the subject matter described herein, showing the gain of the amplifier versus the frequency of the input signal.

FIG. 4 is a graph of the performance of an RX amplifier according to an embodiment of the subject matter described herein, showing the gain of the amplifier versus the frequency of the input signal. FIG. 4 shows that as compared to the response of a conventional amplifier, labeled "NO EQ" in FIG. 4, the gain of the frequency compensated RX amplifier 116, labeled "$C_{FF}+R_{FB}$" on the graph, increases as the input frequency approaches 1 GHz. Shown for comparison is the graph of the gain versus frequency for an RX amplifier that uses a feedback resistor but no feed-forward capacitor, labeled "$R_{FB}$ ONLY" on the graph. Using $R_{FB}$ without $C_{FF}$ also gives an increase in gain as frequency increases, but the amount of gain is less than that provided by a design that uses both $R_{FB}$ and $C_{FF}$.

Decoding operations follow the RX amplifier. The use of latches 118 provides a low-power decoding operation. In one embodiment, the $T^1$ matrix decodes the received values by summing specified combinations of the signals that are output from the RX amplifiers 116 using specified coefficients for the signal magnitudes. For example, to recreate the binary values 108, the $T^{-1}$ matrix may perform operations such as "A+B−(C+D)" and "A+B+C+D". Each of these two linear operations may be implemented by operational latches. The first operation may be performed by the latch illustrated in FIG. 5A and the second operation may be performed by the latch illustrated in FIG. 5B.

Figure 5A:
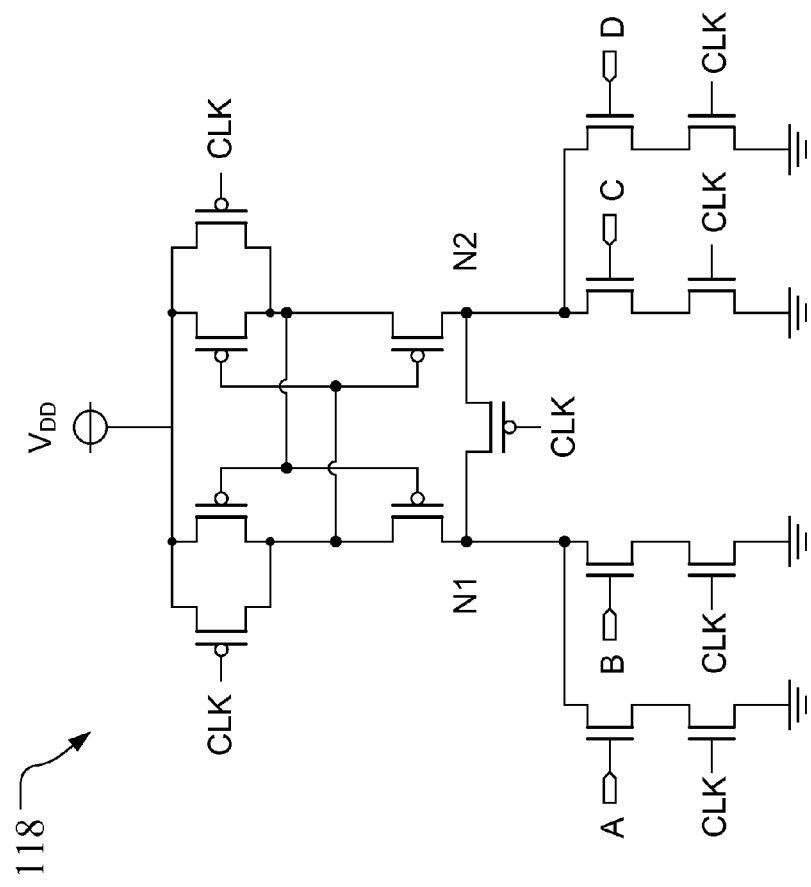
FIGS. 5A through 5D are circuit diagrams illustrating exemplary latches according to an embodiment of the subject matter disclosed herein.

FIG. 5A is a circuit diagram illustrating an exemplary latch 118 according to an embodiment of the subject matter disclosed herein. In the embodiment illustrated in FIG. 5A, latch 118 performs the A+B−(C+D) operation. The NMOS transistors are designed to have relative widths that are proportional to the decoding coefficients of the $T^{-1}$ matrix.

Figure 5B:
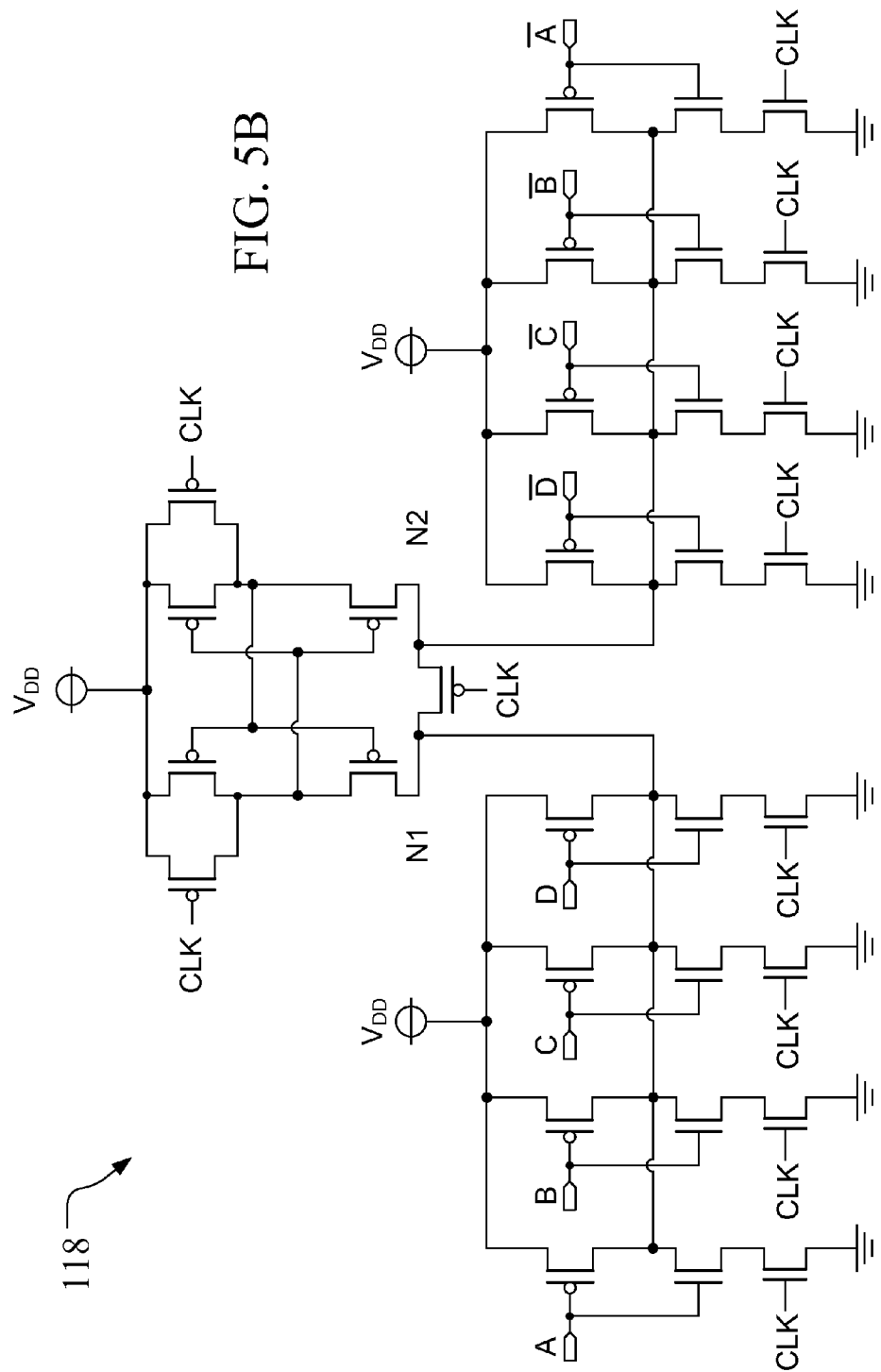

FIG. 5B is a circuit diagram illustrating an exemplary latch 118 according to another embodiment of the subject matter disclosed herein. In the embodiment illustrated in FIG. 5B, latch 118 performs the operation A+B+C+D. In FIG. 5B, the left side input signals are added together and compared to the right side added complement signals. The combined operation is (A+B+C+D)−(−A−B−C−D). As with the latch illustrated in FIG. 5A, in FIG. 5B all NMOS and PMOS transistors which are connected to input signals have widths that are proportional to the decoding coefficients. Additional PMOS devices have been included on the left side and additional NMOS devices have been included on the right side to get proper DC operating points for N1 and N2 so that the latch is able to produce the proper output value for A+B+C+D. Increasing the gain of the latch in this manner increases the current difference at N1 and N2. In one embodiment, to improve the voltage gain during the decoding process, additional amplifiers and buffers may be used after the latches.

Figure 5C:
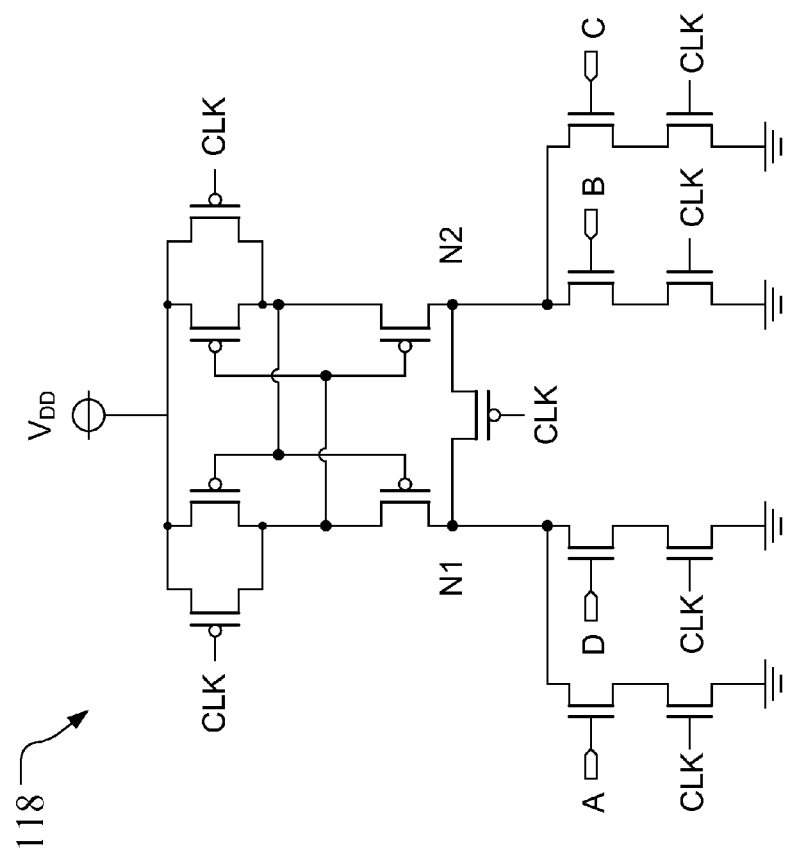

FIG. 5C is a circuit diagram illustrating an exemplary latch 118 according to yet another embodiment of the subject matter disclosed herein. In the embodiment illustrated in FIG. 5C, latch 118 performs the operation A−B−C+D.

Figure 5D:
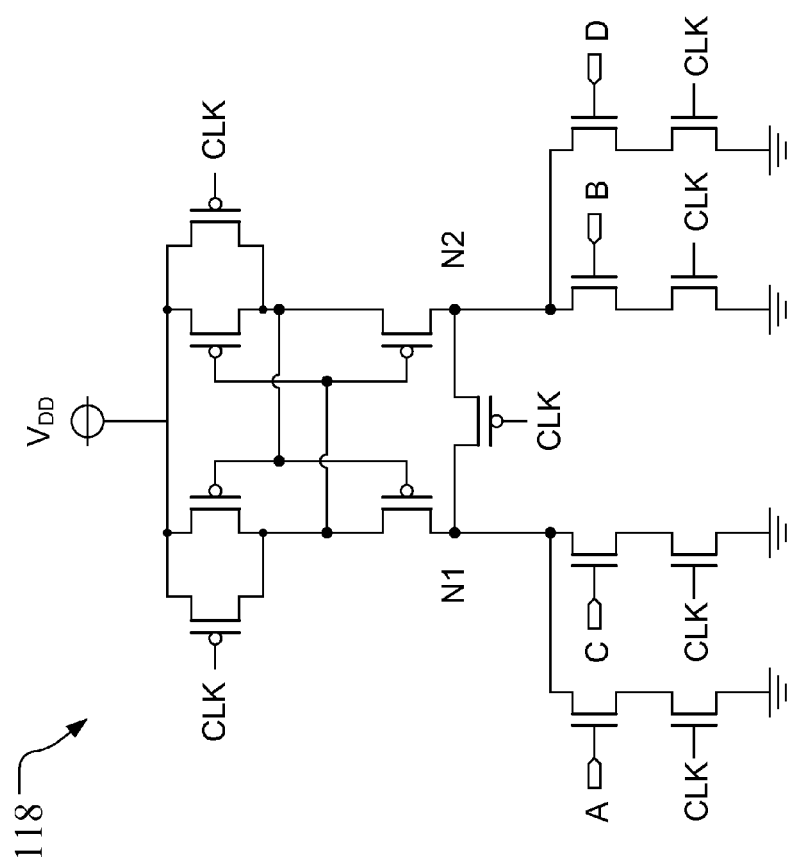

FIG. 5D is a circuit diagram illustrating an exemplary latch 118 according to yet another embodiment of the subject matter disclosed herein.

In the embodiment illustrated in FIG. 5D, latch 118 performs the operation A−B+C−D.

Operations other than the ones implemented by the latches illustrated in FIGS. 5A through 5D are contemplated, and the embodiments illustrated in FIGS. 5A through 5D are illustrative and not limiting.

Furthermore, the embodiments illustrated herein presume that new multimode data is generated and transmitted periodically, e.g., at every clock cycle, and that the data is received periodically at the same clock frequency, but the invention contemplates other clocking schemes, and recognizes that transmission delays may cause the transmit and receive clocks to be out of phase with each other. Logic that may be used to provide new binary data periodically to transmitter 102 or to perform clock recovery within the receiver 104 is omitted for simplicity.

The use of latches having transistor width ratios that correspond to coefficients of the multimode decoding algorithm allows the decoding operation to be performed using much less power than would be required by a system that performed mathematical calculations based on the coefficients of the multimode decoding algorithm. Likewise, the use of transmitter drivers having transistor width ratios that correspond to coefficients of the multimode encoding algorithm allows the encoding operation to be performed using much less power than would be required by a system that performed mathematical calculations based on the coefficients of the multimode encoding algorithm and provided these values to one or more digital to analog converters, for example. Furthermore, the use of frequency-compensated receiver amplifiers increases the maximum length allowed for the multichannel interconnect as compared to conventional multimode systems.

Figure 6:
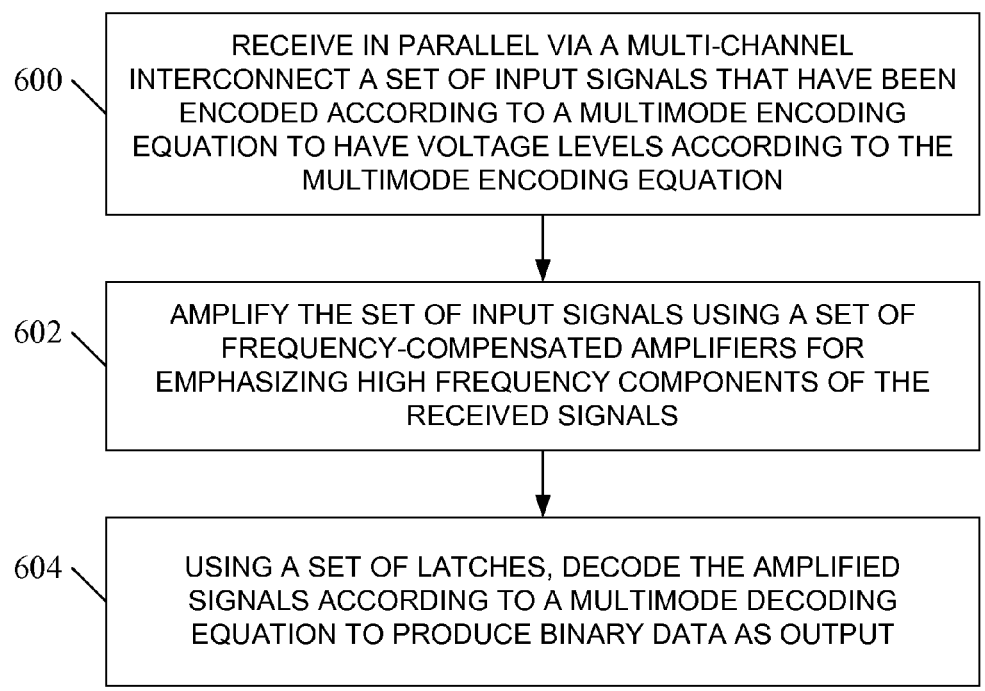
FIG. 6 is a flow chart illustrating an exemplary process for low power multimode interconnect for lossy and tightly coupled multi-channel according to an embodiment of the subject matter described herein.

FIG. 6 is a flow chart illustrating an exemplary process for low power multimode interconnect according to an embodiment of the subject matter described herein. In the embodiment illustrated in FIG. 6, at step 600, a set of input signals that have been encoded according to a multimode encoding equation to have voltage levels according to that multimode encoding equation are received in parallel via a multi-channel interconnect. Referring to the system illustrated in FIG. 1, for example, receiver 104 may receive multimode signals 114 that have been encoded using transmitter 102 and sent via interconnects 106. In one embodiment, interconnects 106 may be a set of tightly-coupled micro-strip lines, but the methods and systems described herein may be applied to other types of interconnects, such as transmission lines, signal lines on a semiconductor or printed circuit board, or other multi-channel interconnects which have the potential to suffer signal degradation due to line loss or crosstalk.

At step 602, the received signals are amplified using a set of frequency compensated amplifiers that emphasize the high-frequency components of the received signals. In the system illustrated in FIG. 1, for example, the signals that are output from interconnects 106 are input to RX amplifiers 116, which produce both a frequency-compensated signal and a frequency-compensated signal of the opposite phase.

At step 604, a set of latches is used to decode the amplified signals according to a multimode decoding equation to produce binary data as output. In the system illustrated in FIG. 1, for example, the outputs of RX amplifiers 116 are fed in various combinations to latches 118 according to the multimode decoding equation. In one embodiment, one latch 118 may sum the voltages provided from RX amplifiers 116 according the equation "A+B−(C+D)", e.g., summing voltages A, B, C bar, and D bar, as illustrated in FIG. 5A, while another latch 118 may sum the voltages according to the equation "A+B+C+D", as illustrated in FIG. 5B. As stated above, a third latch 118 may implement the equation "A−B−C+D" and a fourth latch 118 may implement the equation "A−B+C−D", and so on.

It will be understood that various details of the subject matter described herein may be changed without departing from the scope of the subject matter described herein. For example, the system disclosed in FIG. 1 uses a four-channel multimode interconnect 106, but the same principles described herein may be applied to multimode interconnects using other numbers of channels. Furthermore, the foregoing description is for the purpose of illustration only, and not for the purpose of limitation.

What is claimed is:

1. A system for low power multimode interconnect, the system comprising:
a receiver for receiving in parallel via a multi-channel interconnect a plurality of input signals that have been encoded by a multimode encoding equation to produce multilevel signals that have voltage levels according to the multimode encoding equation and for decoding the received signals according to a multimode decoding equation to produce binary data as output, wherein the receiver comprises:
a plurality of frequency-compensated amplifiers for emphasizing high-frequency components of the received input signals;
a plurality of latches for receiving amplified signals from the frequency-compensated amplifiers and for decoding the amplified signals according to the multimode decoding equation to produce binary data as output; and
a plurality of multilevel transistor drivers, wherein each of the plurality of input signals that have been encoded by the multimode encoding equation to have voltage levels according to the multimode encoding equation is generated by one of the multi-level transmitter drivers.

2. The system of claim 1 wherein the multimode decoding equation is the inverse of the multimode encoding equation.

3. The system of claim 1 wherein each of the multi-level transmitter drivers comprises a plurality of pull-down transistors and wherein each pull-down transistor is controlled by an input bit or a binary complement of an input bit.

4. The system of claim 3 wherein, for each of the plurality of transmitter drivers, relative widths of the plurality of pull-down transistors for that transmitter driver correspond to relative ratios of the coefficients of the multimode encoding algorithm for the multimode channel that is driven by that transmitter driver.

5. The system of claim 1 comprising a multi-channel interconnect, wherein the plurality of input signals is received via the multi-channel interconnect.

6. The system of claim 5 wherein the multi-channel interconnect comprises a plurality of conductors, a plurality of microstrip lines, or a plurality of tightly coupled signal channels.

7. A system for low power multimode interconnect, the system comprising:
a receiver for receiving in parallel via a multi-channel interconnect a plurality of input signals that have been encoded by a multimode encoding equation to produce multilevel signals that have voltage levels according to the multimode encoding equation and for decoding the received signals according to a multimode decoding equation to produce binary data as output, wherein the receiver comprises:
a plurality of frequency-compensated amplifiers for emphasizing high-frequency components of the received input signals; and
a plurality of latches for receiving amplified signals from the frequency-compensated amplifiers and for decoding the amplified signals according to the multimode decoding equation to produce binary data as output;
wherein each of the plurality of amplifiers performs frequency compensation using a feedback resistor or a feedback resistor and a feed-forward capacitor.

8. A system for low power multimode interconnect, the system comprising:
a receiver for receiving in parallel via a multi-channel interconnect a plurality of input signals that have been encoded by a multimode encoding equation to produce multilevel signals that have voltage levels according to the multimode encoding equation and for decoding the received signals according to a multimode decoding equation to produce binary data as output, wherein the receiver comprises:
a plurality of frequency-compensated amplifiers for emphasizing high-frequency components of the received input signals; and
a plurality of latches for receiving amplified signals from the frequency-compensated amplifiers and for decoding the amplified signals according to the multimode decoding equation to produce binary data as output;
wherein each of the plurality of amplifiers produces a first output having a same phase as the input and a second output having an opposite phase as the input.

9. The system of claim 8 wherein each of the plurality of latches performs a summing operation on a subset of the signals output from the plurality of amplifiers according to the coefficients of the decoding equation.

10. The system of claim 9 wherein each of the plurality of latches comprises a set of pull-down transistors, wherein each pull-down transistor is controlled by one of the subset of signals output from the plurality of amplifiers.

11. The system of claim 10 wherein relative widths of the plurality of pull-down transistors correspond to relative ratios of the coefficients of the multimode decoding algorithm.

12. A method for low power multimode interconnect, the method comprising:
receiving in parallel via a multi-channel interconnect a plurality of input signals that have been encoded by a multimode encoding equation to produce multilevel signals that have voltage levels according to the multimode encoding equation;
amplifying the plurality of input signals using a plurality of frequency compensated amplifiers for emphasizing high-frequency components of the received signals; and
using a set of latches to decode the amplified signals according to a multimode decoding equation to produce binary data as output;
wherein each of the plurality of input signals that have been encoded by the multimode encoding equation to have voltage levels according to the multimode encoding equation is generated by one of a plurality of multi-level transmitter drivers.

13. The method of claim 12 wherein the multimode decoding equation is the inverse of the multimode encoding equation.

14. The method of claim 12 wherein each of the plurality of multi-level transmitter drivers comprises a plurality of pull-down transistors and wherein each pull-down transistor is controlled by an input bit or a binary complement of an input bit.

15. The method of claim 14 wherein, for each of the plurality of transmitter drivers, relative widths of the plurality of pull-down transistors for that transmitter driver correspond to relative ratios of the coefficients of the multimode encoding algorithm for the multimode channel that is driven by that transmitter driver.

16. The method of claim 12 wherein the plurality of input signals is received via a multi-channel interconnect.

17. The method of claim 16 wherein the multi-channel interconnect comprises a plurality of conductors, a plurality of microstrip lines, or a plurality of tightly coupled signal channels.

18. The method of claim 16 wherein the multi-channel interconnect comprises a plurality of tightly coupled signal channels.

19. A method for low power multimode interconnect, the method comprising:
   receiving in parallel via a multi-channel interconnect a plurality of input signals that have been encoded by a multimode encoding equation to produce multilevel signals that have voltage levels according to the multimode encoding equation;
   amplifying the plurality of input signals using a plurality of frequency compensated amplifiers for emphasizing high-frequency components of the received signals; and
   using a set of latches to decode the amplified signals according to a multimode decoding equation to produce binary data as output;
   wherein each of the plurality of amplifiers performs frequency compensation using a feedback resistor or a feedback resistor and a feed-forward capacitor.

20. A method for low power multimode interconnect, the method comprising:
   receiving in parallel via a multi-channel interconnect a plurality of input signals that have been encoded by a multimode encoding equation to produce multilevel signals that have voltage levels according to the multimode encoding equation;
   amplifying the plurality of input signals using a plurality of frequency compensated amplifiers for emphasizing high-frequency components of the received signals; and
   using a set of latches to decode the amplified signals according to a multimode decoding equation to produce binary data as output;
   wherein each of the plurality of amplifiers produces a first output having a same phase as the input and a second output having an opposite phase as the input.

21. The method of claim 20 wherein each of the plurality of latches performs a summing operation on a subset of the signals output from the plurality of amplifiers according to the coefficients of the decoding equation.

22. The method of claim 21 wherein each of the plurality of latches comprises a set of pull-down transistors, wherein each pull-down transistor is controlled by one of the subset of signals output from the plurality of amplifiers.

23. The method of claim 22 wherein relative widths of the plurality of pull-down transistors correspond to relative ratios of the coefficients of the multimode decoding algorithm.

24. A method for low power multimode interconnect, the method comprising:
   receiving in parallel via a multi-channel interconnect a plurality of input signals that have been encoded by a multimode encoding equation to produce multilevel signals that have voltage levels according to the multimode encoding equation;
   amplifying the plurality of input signals using a plurality of frequency compensated amplifiers for emphasizing high-frequency components of the received signals; and
   using a set of latches to decode the amplified signals according to a multimode decoding equation to produce binary data as output;
   wherein the multi-channel interconnect comprises a plurality of micro-strip lines.

25. A non-transitory computer readable medium having stored thereon executable instructions that when executed by the processor of a computer control the computer to perform steps comprising:
   receiving in parallel via a multi-channel interconnect a plurality of input signals that have been encoded by a multimode encoding equation to produce multilevel signals that have voltage levels according to the multimode encoding equation;
   amplifying the plurality of input signals using a plurality of frequency compensated amplifiers for emphasizing high-frequency components of the received signals;
   using a set of latches to decode the amplified signals according to a multimode decoding equation to produce binary data as output; and
   a plurality of multilevel transistor drivers, wherein each of the plurality of input signals that have been encoded by the multimode encoding equation to have voltage levels according to the multimode encoding equation is generated by one of the multi-level transmitter drivers.

* * * * *